US011258115B2

(12) United States Patent
Lo Rito et al.

(10) Patent No.: US 11,258,115 B2
(45) Date of Patent: Feb. 22, 2022

(54) COOLING MODULE FOR AN ELECTRICAL ENERGY STORAGE SYSTEM FOR AN ELECTRIC DRIVE VEHICLE

(71) Applicant: MARELLI EUROPE S.p.A., Corbetta (IT)

(72) Inventors: Gianfranco Lo Rito, Venaria Reale (IT); Nazario Bellato, Bologna (IT); Razvan-Vasile Deji, Cluji (RO)

(73) Assignee: MARELLI EUROPE S.p.A., Corbetta (IT)

(*) Notice: Subject to any disclaimer, the term of this patent is extended or adjusted under 35 U.S.C. 154(b) by 98 days.

(21) Appl. No.: 16/716,673

(22) Filed: Dec. 17, 2019

(65) Prior Publication Data

US 2020/0203785 A1 Jun. 25, 2020

(30) Foreign Application Priority Data

Dec. 21, 2018 (IT) .......................... 102018000020902

(51) Int. Cl.
*H01M 10/613* (2014.01)
*H01M 10/625* (2014.01)
(Continued)

(52) U.S. Cl.
CPC .......... *H01M 10/613* (2015.04); *B60L 50/64* (2019.02); *B60L 58/26* (2019.02); *H01M 10/625* (2015.04);
(Continued)

(58) Field of Classification Search
CPC ...... B60L 50/64; B60L 58/26; H01M 10/613; H01M 10/625; H01M 10/637;
(Continued)

(56) References Cited

U.S. PATENT DOCUMENTS 5,753,384 A * 5/1998 Kimberg ........... H01M 10/6565
429/406
2011/0052960 A1* 3/2011 Kwon ............... H01M 10/0481
429/120
(Continued)

FOREIGN PATENT DOCUMENTS

CN 106654442 A 5/2017
DE 102012200400 A1 7/2013
(Continued)

OTHER PUBLICATIONS

Search Report for Italian Patent Application No. 201800020902 dated Jun. 25, 2019.

*Primary Examiner* — Adam A Arciero
(74) *Attorney, Agent, or Firm* — Howard & Howard Attorneys PLLC (57) ABSTRACT

A cooling module for an electrical energy storage system for an electric drive vehicle. The cooling module has an exchanger plate that is hollow on the inside so as to have, on the inside, a circulation chamber that is designed to contain a cooling liquid. The exchanger plate has: an inlet opening that is obtained through a front wall of the exchanger plate and is designed to allow the cooling liquid to flow into the circulation chamber, and an outlet opening that is obtained through a rear wall of the exchanger plate and is designed to allow the cooling liquid to flow out of the circulation chamber. The cooling module has a plurality of interface elements, which are placed inside the circulation chamber, are shaped like a wave, and are arranged in rows.

16 Claims, 8 Drawing Sheets

(51) Int. Cl.
*H01M 10/6554* (2014.01)
*H01M 10/6556* (2014.01)
*H01M 10/6568* (2014.01)
*B60L 50/64* (2019.01)
*B60L 58/26* (2019.01)
*H01M 50/20* (2021.01)

(52) U.S. Cl.
CPC ... *H01M 10/6554* (2015.04); *H01M 10/6556* (2015.04); *H01M 10/6568* (2015.04); *H01M 50/20* (2021.01); *H01M 2220/20* (2013.01)

(58) Field of Classification Search
CPC ............. H01M 10/647; H01M 10/651; H01M 10/6554; H01M 10/6555; H01M 10/6557; H01M 10/6567; H01M 10/6568; H01M 2220/20; H01M 50/20; Y02E 60/10; Y02T 10/70
See application file for complete search history.

(56) References Cited

U.S. PATENT DOCUMENTS

| | | | |
|---|---|---|---|
| 2012/0009457 A1* | 1/2012 | Lee | B60L 11/1874 |
| | | | 429/120 |
| 2015/0198372 A1* | 7/2015 | Desikan | F28F 3/027 |
| | | | 165/151 |

FOREIGN PATENT DOCUMENTS

| | | | |
|---|---|---|---|
| EP | 2337141 A1 | 6/2011 |
| WO | 2013139908 A1 | 9/2013 |
| WO | 2013186020 A1 | 12/2013 |

\* cited by examiner

COOLING MODULE FOR AN ELECTRICAL ENERGY STORAGE SYSTEM FOR AN ELECTRIC DRIVE VEHICLE

CROSS-REFERENCE TO RELATED APPLICATIONS

This patent application claims priority from Italian patent application no. 102018000020902 filed on Dec. 21, 2018, the entire disclosure of which is incorporated herein by reference.

TECHNICAL FIELD

The present invention relates to a cooling module for an electrical energy storage system for an electric drive vehicle.

PRIOR ART

Patent applications WO2013186020A1, WO2013139908A1 DE102012200400A1 and EP2337141A1 describe a rechargeable battery pack for a vehicle. The battery pack comprises a plurality of rechargeable electrochemical storage cells that have the shape of a parallelepiped (i.e. are flat) and are placed in succession one beside the other. Moreover, the battery pack comprises a plurality of cooling modules which have the shape of a parallelepiped (i.e. are flat) and are interleaved with the storage cells. Each cooling module is formed by a metal plate (therefore by a thermally conductive material) in which a hydraulic circuit is obtained for the forced circulation of a cooling liquid.

Patent applications US2011052960A1 and US2015198372A1 describe an electrical energy storage system for an electric drive vehicle comprising a plurality of cooling modules interleaved with batteries. Each cooling module 3 comprises an exchanger plate, which has the shape of a parallelepiped and is hollow on the inside so as to have, on the inside, a circulation chamber that is designed for containing a cooling liquid, and a plurality of interface elements, which are placed inside the circulation chamber of the exchanger plate, are shaped like a wave, are oriented parallel to a front wall and to a rear wall of the exchanger plate, and are arranged in rows that are placed between the front wall of the exchanger plate and the rear wall of the exchanger plate with a distance other than zero between one row and the adjacent rows.

DESCRIPTION OF THE INVENTION

The object of the present invention is to provide a cooling module for an electrical energy storage system for an electric drive vehicle, which cooling module allows to increase the efficiency and effectiveness of cooling without increasing the bulk and the weight and, at the same time, being easy and inexpensive to implement.

According to the present invention, a cooling module is provided for an electrical energy storage system for an electric drive vehicle, as claimed in the appended claims.

The claims describe preferred embodiments of the present invention forming an integral part of the present disclosure.

BRIEF DESCRIPTION OF THE DRAWINGS

The present invention will now be described with reference to the annexed drawings, which illustrate some non-limiting embodiments thereof, wherein.

PREFERRED EMBODIMENTS OF THE INVENTION

Figure 1:
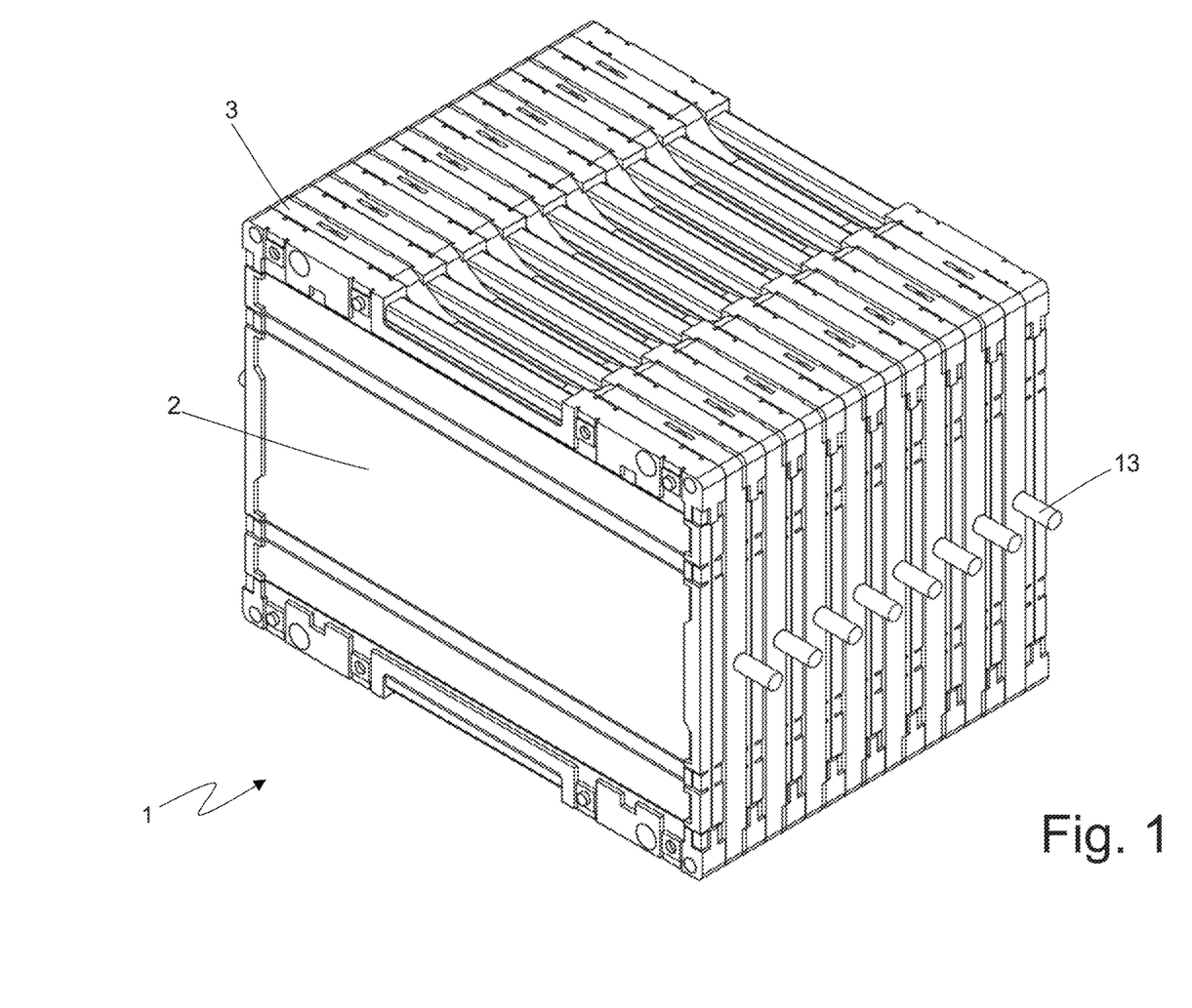
FIG. 1 is a perspective view of an electrical energy storage system for an electric drive vehicle.

In FIG. 1, number 1 denotes as a whole an electrical energy storage system 1 for an electric drive vehicle.

The storage system 1 comprises a plurality of rechargeable electrochemical storage cells 2 having the shape of a parallelepiped, which are placed parallel to one another beside one another and a plurality of cooling modules 3, which have the shape of a parallelepiped and are interleaved with the rechargeable electrochemical storage cells 2. In other words, the storage system 1 is a "sandwich" formed by a series of rechargeable electrochemical storage cells 2 interleaved with the cooling modules 3.

Figure 2:
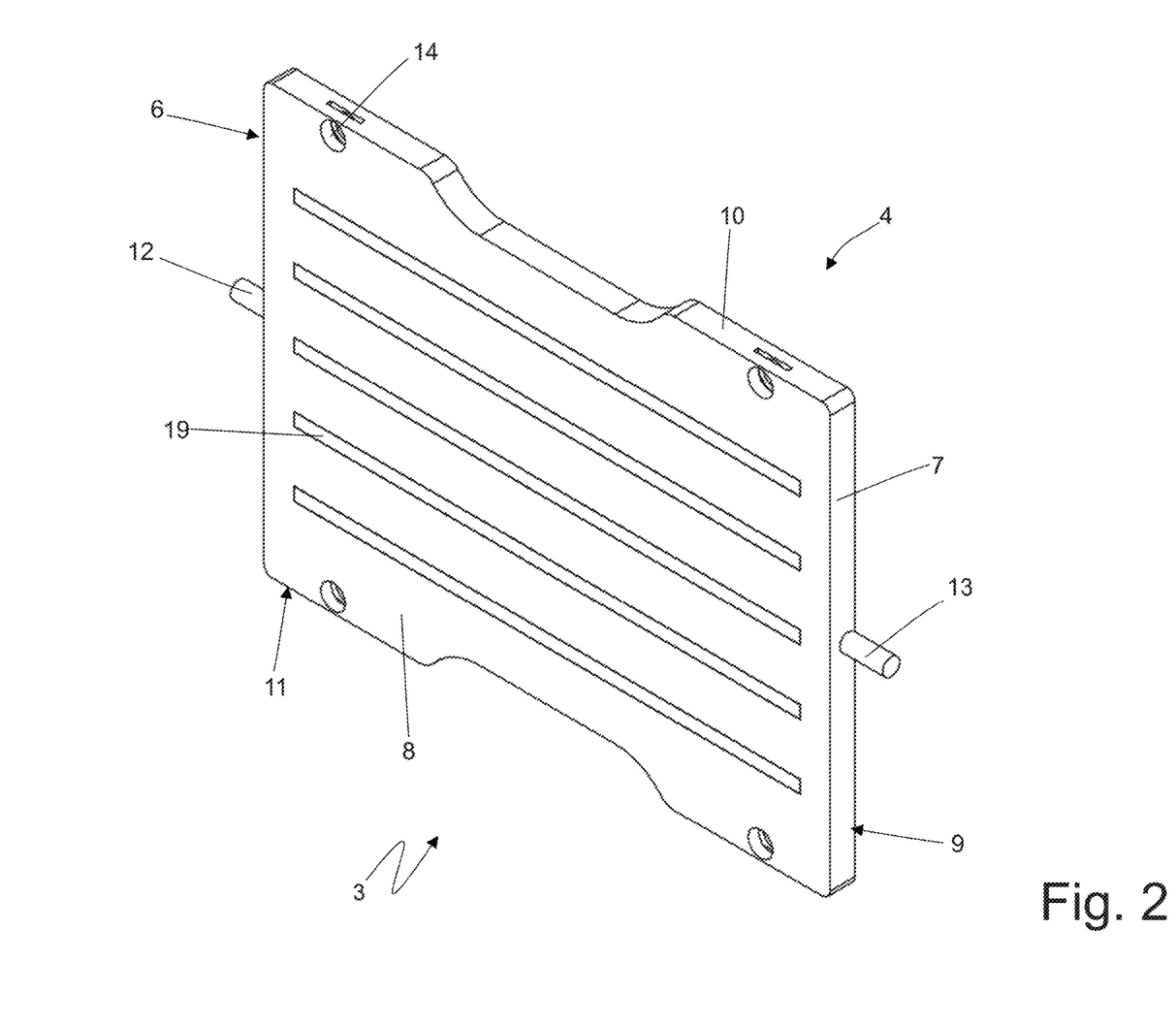
FIG. 2 is a perspective view of a cooling module of the storage system of FIG. 1.
Figure 4:
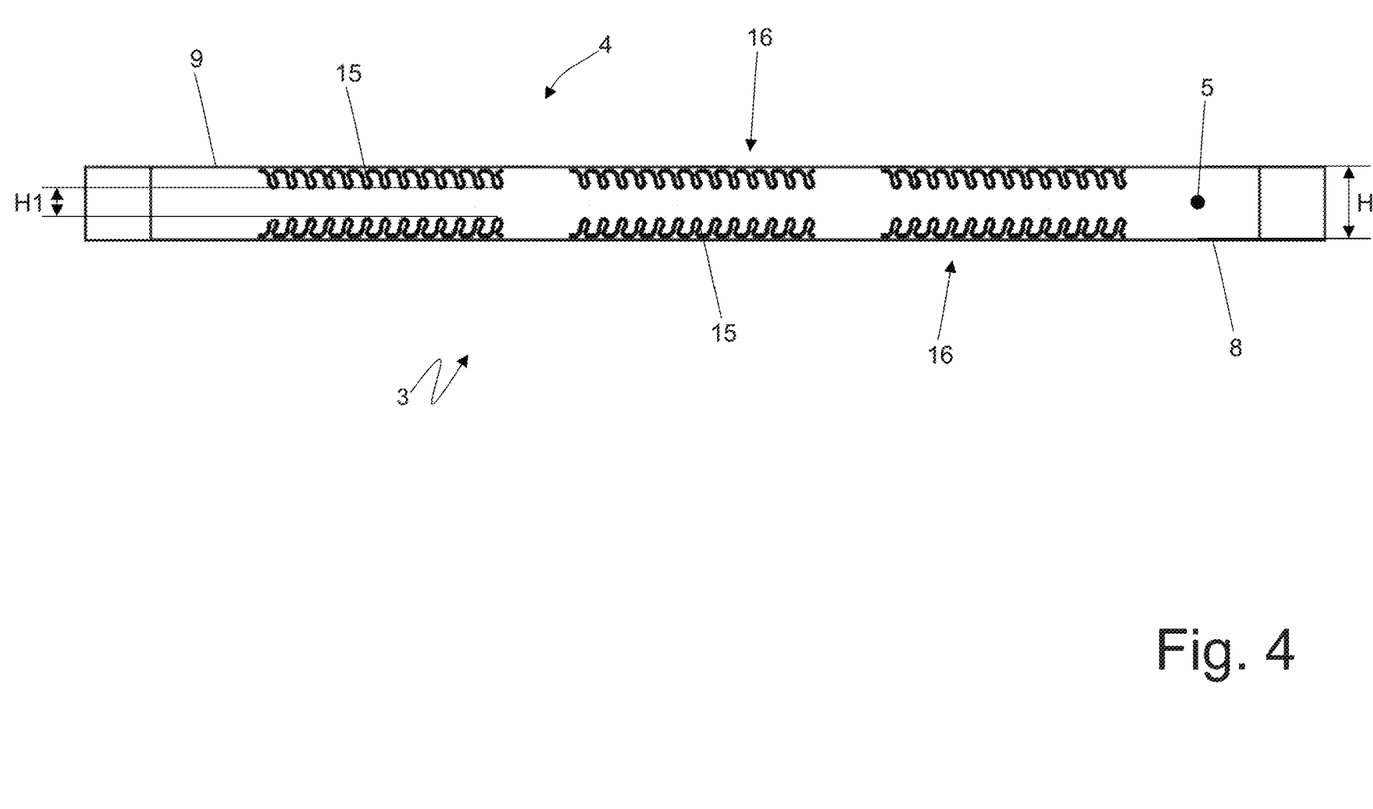
FIG. 4 is a cross-sectional view according to the line IV-IV of the cooling module of FIG. 2.

As illustrated in FIGS. 2 and 4, each cooling module 3 comprises an exchanger plate 4, which has the shape of a parallelepiped and is hollow on the inside so as to have, on the inside, a circulation chamber 5 (illustrated in FIG. 4) designed for containing a cooling liquid.

The exchanger plate 4 has the shape of a parallelepiped and has a front wall 6 and a rear wall 7 parallel to and opposite one another, two side walls 8 and 9, which are parallel to and opposite one another and perpendicular to the walls 6 and 7, and an upper wall 10 and a lower wall 11, which are parallel to and opposite one another and are perpendicular to the walls 6-9.

Each exchanger plate 4 has an inlet opening 12 which is obtained through the front wall 6 of the exchanger plate 4 and is designed to allow the cooling liquid to flow into the circulation chamber 5; moreover, the exchanger plate 4 has an outlet opening 13 which is obtained through the rear wall 7 of the exchanger plate 4 and is designed to allow the cooling liquid to flow out of the circulation chamber 5. According to a preferred embodiment illustrated in the attached figures, the two openings 12 and 13 are aligned and opposite one another.

According to a preferred embodiment illustrated in the attached figures, each exchanger plate 4 has four through-holes 14 which are used to insert tie rods which compact the storage system 1.

Figure 3:
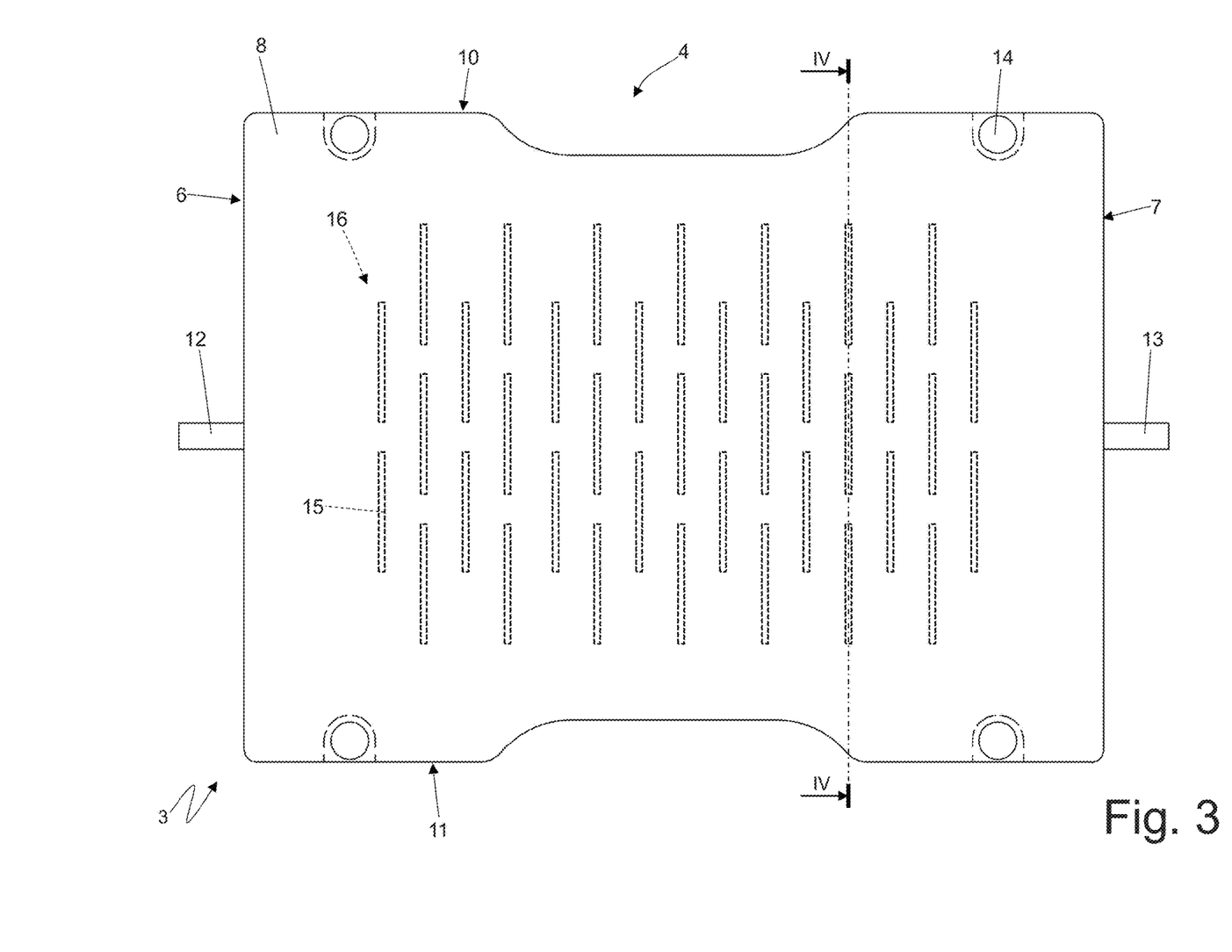
FIG. 3 is a side view of the cooling module of FIG. 2 which is not part of the present invention.

As illustrated in FIGS. 3 and 4, each cooling module 3 comprises a plurality of interface elements 15, which are placed inside the circulation chamber 5 of the exchanger plate 4, are shaped like a wave, are oriented parallel to the front wall 6 and to the rear wall 7 of the exchanger plate 4, and are arranged in rows 16 that are placed between the front wall of the exchanger plate 4 and the rear wall 7 of the exchanger plate 4 with a distance other than zero between one row 16 and the adjacent rows 16 (i.e. each row 16 is spaced from the adjacent rows 16); the rows 16 of the interface elements 15 are oriented parallel to the front wall 6 and to the rear wall 7 of the exchanger plate 4. According to a preferred embodiment illustrated in the attached figures, the pitch between the rows 16 (i.e. the distance between one row 16 and the adjacent rows 16) is constant, that is, equal for all rows 16; according to a different embodiment not illustrated, the pitch between the rows 16 (i.e. the distance between one row 16 and the adjacent rows 16) is variable and smaller (narrow) in the central area and larger (wide) in the peripheral areas (i.e. near the openings 12 and 13).

According to a preferred embodiment illustrated in the attached figures, the number of interface elements 15 making up each row 16 is variable from row 16 to row 16; according to a different embodiment not illustrated, the number of interface elements 15 making up each row 16 is constant (i.e. equal for all the rows 16).

Figure 7:
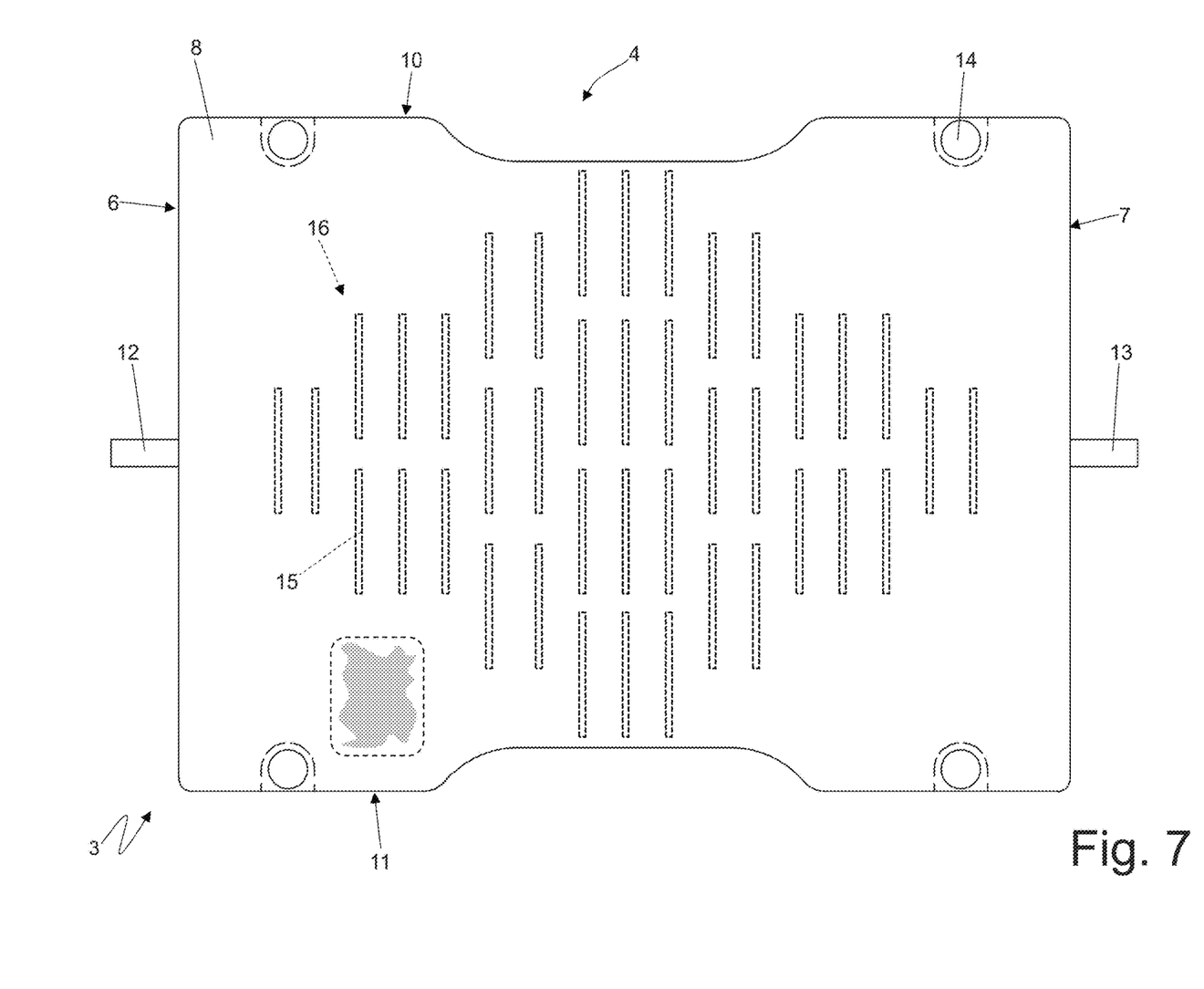
FIG. 7 is a side view of a further alternative of the cooling module of FIG. 2 which is the object of the present invention.

In the embodiment illustrated in FIG. 3, the number of interface elements 15 making up each row 16 is cyclically variable between two and three (i.e. a row 16 formed by three interface elements 15 is followed and preceded by a row 16 formed by two interface elements 15). According to a different embodiment illustrated in FIG. 7, the number of interface elements 15 making up each row 16 progressively increases from the front wall 6 of the exchanger plate 4 towards a centre of the exchanger plate 4 and progressively decreases from the centre of the exchanger plate 4 towards the rear wall 7 of the exchanger plate 4; in particular, the number of interface elements 15 making up each row 16 varies in a symmetric manner relative to the centre of the exchanger plate 4. This variation of the number of interface elements 15 making up each row 16 (progressive increase from the front wall 6 towards the centre and progressive decrease from the centre towards the rear wall 7) allows to obtain a high heat exchange between the cooling liquid flowing inside the circulation chamber 5 and the interface elements 15 at the same time producing reduced pressure drops caused by the flow of the cooling liquid through the circulation chamber 5.

According to a preferred embodiment illustrated in the attached figures, all the interface elements 15 are completely identical to one another; this solution reduces the costs and the complexity of production but on the other hand limits the possibilities of varying the conformation of the various rows 16. According to a different embodiment not illustrated, the interface elements 15 are not all equal to one another and are differentiated for example for their length, width and/or height.

As illustrated in FIG. 4, each interface element 15 is integral (typically by means of welding) just and only with a corresponding side wall 8 or 9 of the exchanger plate 4; in particular some rows 16 (half of the rows 16) of interface elements 15 are integral (welded) just and only with the side wall 8 of the exchanger plate 4 and therefore not only connected to (i.e. they are at a given distance from) the side wall 9 of the exchanger plate 4 and the remaining rows 16 (the remaining half of the rows 16) of interface elements 15 are integral (welded) just and only to the side wall 9 of the exchanger plate 4 and therefore not only connected to (i.e. they are at a certain distance from) the side wall 8 of the exchanger plate 4. This arrangement of the interface elements 15 allows to reduce the load losses caused by the flow of the cooling liquid through the circulation chamber 5 without penalizing the heat exchange between the cooling liquid flowing inside the circulating chamber 5 and the interface elements 15.

According to a preferred embodiment illustrated in the attached figures, the rows 16 of interface elements 15 integral with the side wall 8 of the exchanger plate 4 are aligned and facing corresponding rows 16 of interface elements 15 integral with the side wall 9 of the exchanger plate 4; in other words, the set of the rows 16 of interface elements 15 integral with the side wall 8 of the exchanger plate 4 is completely identical and arranged mirror-like to the set of rows 16 of interface elements 15 integral with the side wall 9 of the exchanger plate 4. According to a different embodiment not illustrated, the rows 16 of interface elements 15 integral with the side wall 8 of the exchanger plate 4 are not aligned and facing corresponding rows 16 of interface elements 15 integral with the side wall 9 of the exchanger plate 4; in particular, the rows 16 of interface elements 15 integral with the side wall 8 of the exchanger plate 4 are placed between the rows 16 of interface elements 15 integral with the side wall 9 of the exchanger plate 4.

Figure 5:
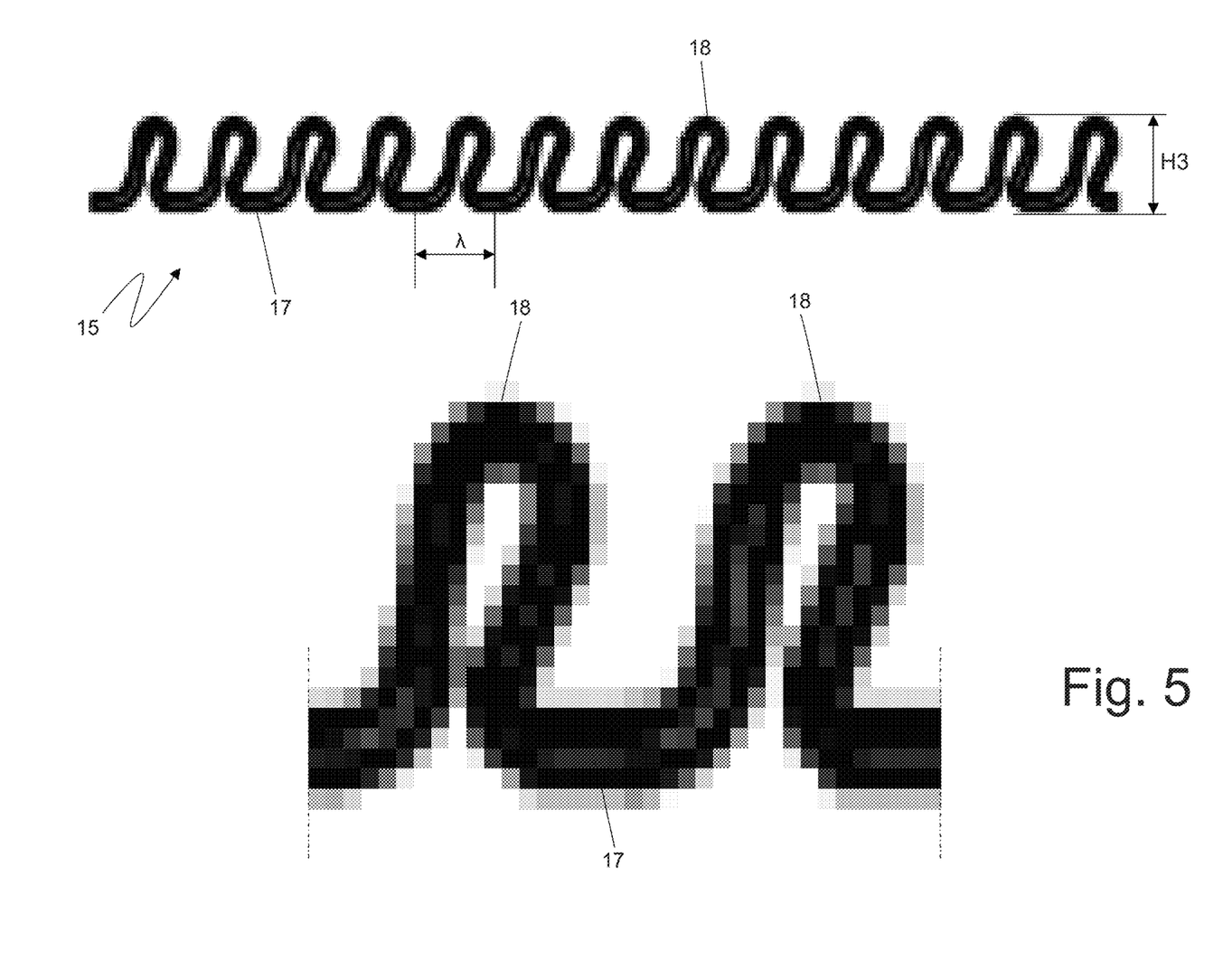
FIG. 5 is a cross-sectional view on an enlarged scale of an interface element of the cooling module of FIG. 2.
Figure 6:
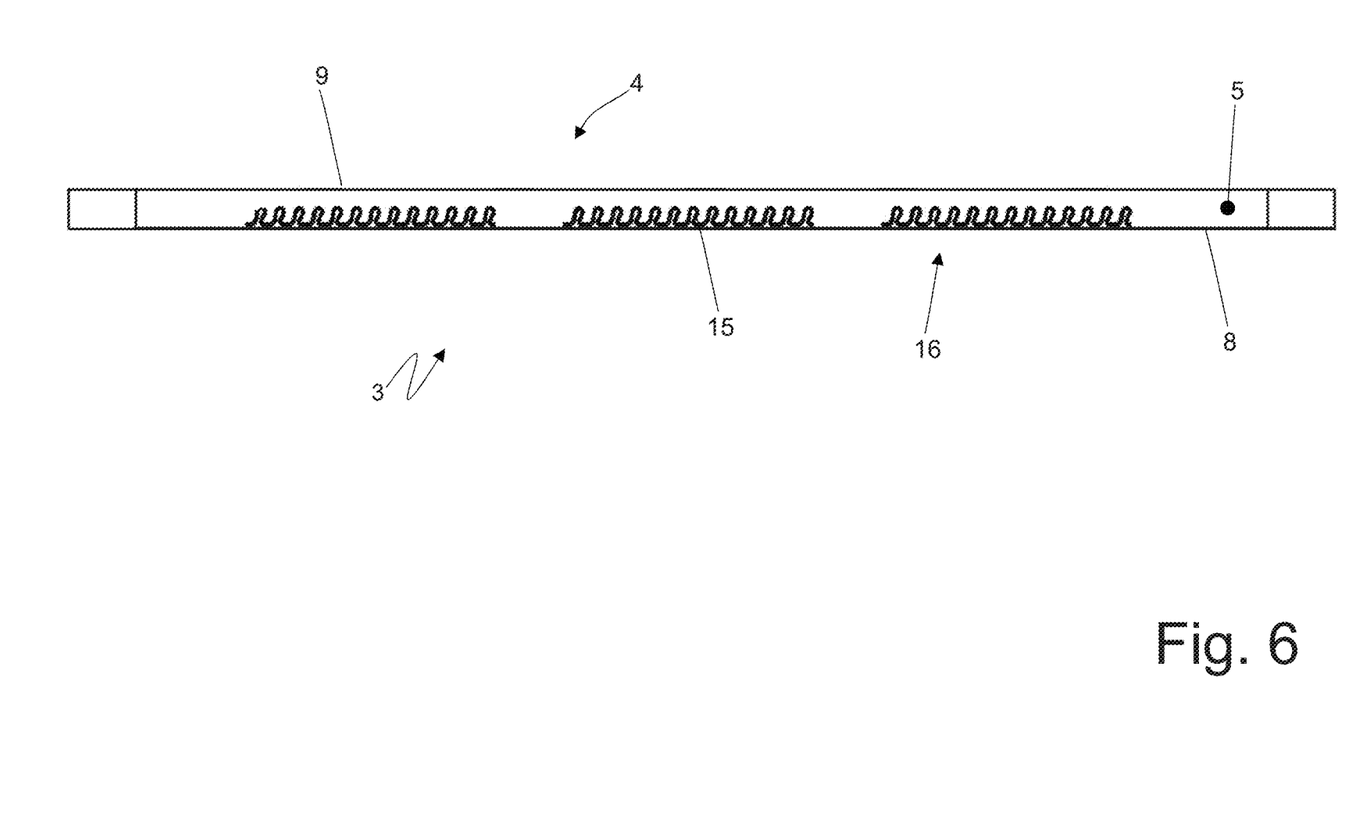
FIG. 6 is a cross-sectional view according to the line IV-IV of an alternative of the cooling module of FIG. 2.

As illustrated in FIG. 5, the waves of each interface element 15 (which, as mentioned above, is shaped like a wave) have a succession of troughs 17 which rest against and are fixed to a side wall 8 or 9 of the exchanger plate 4 and a succession of crests 18 which are arranged at a distance other than zero from the other side wall 9 or 8 of the exchanger plate 4 (and at a distance other than zero from the crests 18 of the corresponding interface element 15 which faces and is fixed to the other side wall 9 or 8 of the exchanger plate 4).

According to a preferred embodiment illustrated in FIG. 4, a distance H1 between the crests 18 of the interface elements 15 integral with the side wall 8 of the exchanger plate 4 and the crests 18 of the interface elements 15 integral with the side wall 9 of the exchanger plate 4 is equal to 20-45%, preferably 35%, of a distance H2 between the side wall 8 of the exchanger plate 4 and the side wall 9 of the exchanger plate 4 (i.e. of a thickness H2 of the exchanger plate 4). In other words, the central area of the circulation chamber 5 is free from the interface elements 15 (i.e. is not engaged by the interface elements 15) has a thickness H1 (i.e. the distance H1 between the crests 18 of the interface elements 15 integral with the side wall 8 of the exchanger plate 4 and the crests 18 of the interface elements 15 integral with the side wall 9 of the exchanger plate 4) equal to 20-45% of the thickness H2 of the exchanger plate 4 (i.e. of the distance H2 between the side wall 8 of the exchanger plate 4 and the side wall 9 of the exchanger plate 4).

According to a preferred embodiment illustrated in FIG. 5, a distance H3 between the troughs 17 and the crests 18 of each interface element 15 (i.e. the thickness H3 of each interface element 15) is equal to 25-35%, preferably 30%, of the distance H2 between the side wall 8 of the exchanger plate 4 and the side wall 9 of the exchanger plate 4 (i.e. of the thickness H2 of the exchanger plate 4).

According to a preferred embodiment illustrated in FIG. 5, the wavelength $\lambda$ of the waves of each interface element 15 is always constant and is equal to 55-70%, preferably 62%, of the distance H2 between the side wall 8 of the exchanger plate 4 and the side wall 9 of the exchanger plate 4 (i.e. of the thickness H2 of the exchanger plate 4).

According to a preferred embodiment illustrated in the attached figures, the waves of each interface element 15 each have an asymmetrical shape, in which an initial half-wave has an amplitude which is smaller than an amplitude of a final half-wave.

According to a preferred embodiment illustrated in the attached figures, the waves of each interface element 15 have the respective crests 18 flattened, so that each crest 18 is flat and parallel to the side walls 8 and 9 of the exchanger plate 4; similarly, the waves of each interface element 15 have the respective troughs 17 flattened, so that each trough is flat and parallel to the side walls 8 and 9 of the exchanger plate 4.

Figure 8:
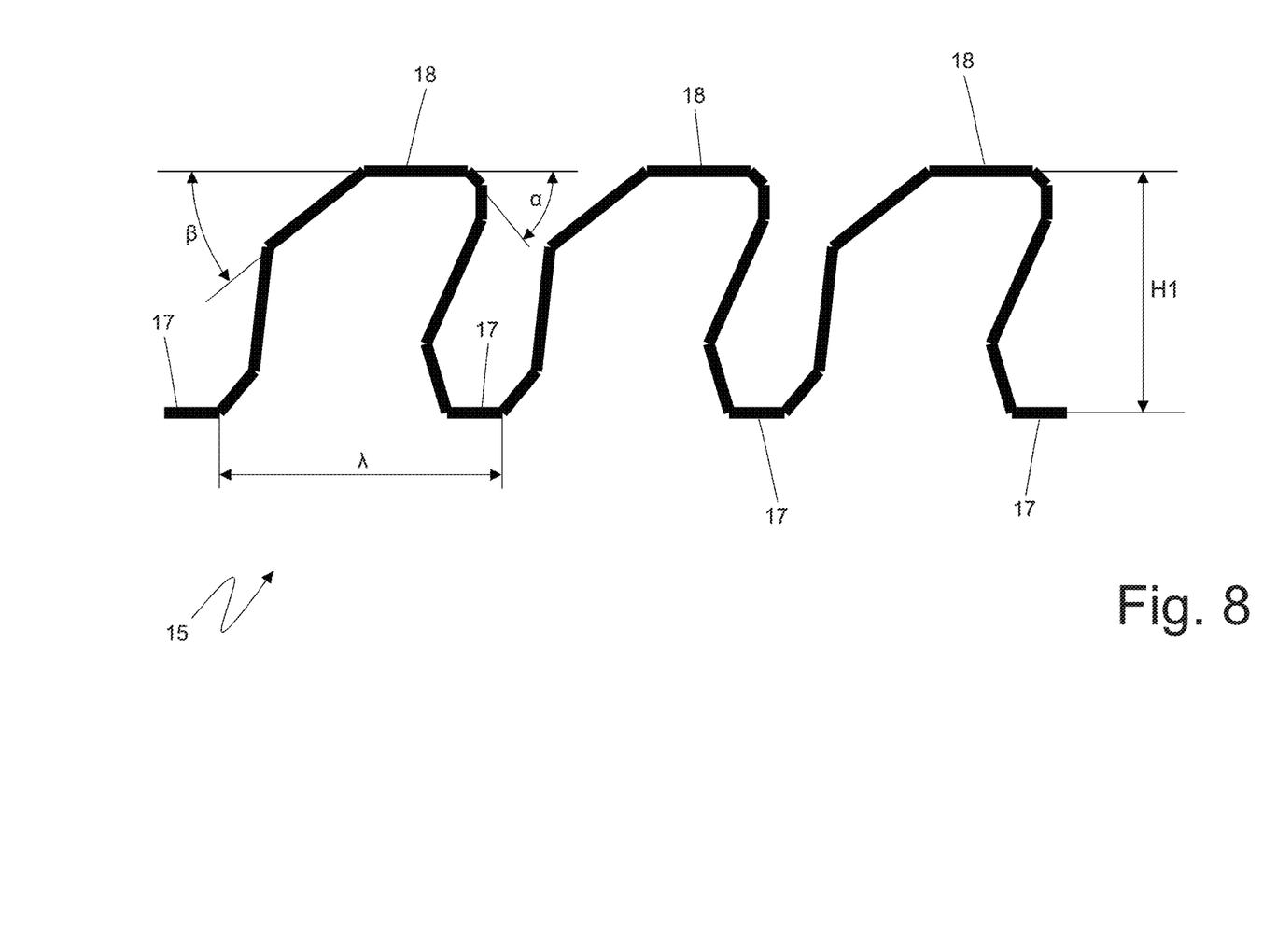
FIG. 8 is a schematic view of part of the interface element of FIG. 5 according to an alternative embodiment.

According to the embodiment illustrated in FIG. 8, the waves of each interface element 15 are made up of a succession of flat panels; in this embodiment, preferably an angle α defined between a crest 18 and the subsequent panel is smaller than 20° and an angle β defined between a crest 18 and the previous panel is smaller than 60°.

According to the embodiment illustrated in FIG. 8, each crest 18 has a greater extension than the troughs 17; whereas, in the embodiment illustrated in FIG. 5, each crest 18 has a smaller extension than the troughs 17. In other words, each crest 18 has a different extension relative to the troughs 17.

The above-described conformation of the interface elements 15 allows to reduce the load losses caused by the cooling liquid flowing through the circulation chamber 5 without penalizing the heat exchange between the cooling liquid flowing inside the circulating chamber 5 and the interface elements 15.

As illustrated in FIG. 2, each cooling module 3 comprises flat heating elements 19 which are fixed to the side wall 8 of the exchanger plate 4 and to the side wall 9 of the exchanger plate 4 and are designed to be traversed by an electric current in order to produce heat by Joule effect. According to a different embodiment, the flat heating elements 19 are arranged only on one side of the exchanger plate 4, i.e. the flat heating elements 19 are fixed only to the side wall 8 of the exchanger plate 4 or are fixed only to the side wall 9 of the exchanger plate 4.

According to a preferred embodiment illustrated in FIG. 2, the heating elements 19 are fixed to an outer surface of the side walls 8 and 9 of the exchanger plate 4 on the opposite side of the circulation chamber 5 (therefore the heating elements 19 are not wetted by the cooling liquid contained in the circulation chamber 5); according to a different embodiment not illustrated, the heating elements 19 are fixed to an inner surface of the side walls 8 and 9 of the exchanger plate 4 and are therefore arranged inside the circulation chamber 5 in direct contact with the cooling liquid.

According to a preferred embodiment, the heating elements 19 are PTC thermistors whose electrical resistance increases as the temperature increases (i.e. for the same electrical voltage applied to the ends of the heating elements 19, the heat produced by the heating elements 19 decreases as their temperature increases).

The cooling modules 3 are part of a cooling circuit which performs the circulation of the cooling liquid and integrates on the inside thereof phase-change materials (PCM) which are not in direct contact with the cooling liquid (i.e. they are housed in cavities hydraulically isolated from the cooling liquid and whose walls are wet by the cooling liquid).

Phase-change materials are latent heat accumulating materials, which exploit the phase transition phenomenon to absorb incoming energy flows, storing a large amount of energy and maintaining a constant temperature. Phase-change materials are solid at room temperature but when the latter rises and exceeds a certain threshold, which varies depending on the material, they liquefy by accumulating heat (latent heat from liquefaction); in the same way, when the temperature drops, the phase-change materials solidify and release heat (latent heat from solidification).

In this way, the phase-change materials integrated in the cooling circuit accumulate thermal energy (helping to remove heat and therefore performing a cooling function) when the vehicle is in motion and release thermal energy when the vehicle is still.

For example, as phase-change materials (inserted in cavities hydraulically isolated from the cooling liquid) paraffin waxes or mixtures of metal foams with paraffin waxes can be used. Depending on their chemical composition, phase-change materials can have a melting temperature comprised between 5° C. and 80° C.

The embodiments described herein can be combined with each other without departing from the scope of the present invention.

The cooling module 3 described above has numerous advantages.

Firstly, the cooling module 3 described above allows to obtain a high cooling efficiency and a high cooling effectiveness.

Moreover, the cooling module 3 described above has a reduced size and weight.

Finally, the cooling module 3 described above is easy and inexpensive to implement.

LIST OF REFERENCE NUMBERS OF THE FIGURES 1 storage system
2 storage cells
3 cooling modules
4 exchanger plate
5 circulation chamber
6 front wall
7 rear wall
8 side walls
9 side walls
10 upper wall
11 lower wall
12 inlet opening
13 outlet opening
14 through-holes
15 interface elements
16 rows
17 troughs
18 crests
19 heating elements
H1 distance
H2 distance
H3 distance
λ wavelength

The invention claimed is:

1. A cooling module (3) for an electrical energy storage system (1) for an electric drive vehicle;
the cooling module (3) comprises an exchanger plate (4), which has the shape of a parallelepiped and is hollow on the inside so as to have, on the inside, a circulation chamber (5) which is designed to contain a cooling liquid;
the exchanger plate (4) has an inlet opening (12), which is obtained through a front wall (6) of the exchanger plate (4) and is designed to allow the cooling liquid to flow into the circulation chamber (5);
the exchanger plate (4) has an outlet opening (13) that is obtained through a rear wall (7) of the exchanger plate (4), which is parallel to and opposite the front wall (6), and is designed to allow the cooling liquid to flow into the circulation chamber (5);

the exchanger plate (4) has a first side wall (8) and a second side wall (9), which are parallel to and opposite one another and are perpendicular to the front wall (6) of the exchanger plate (4) and to the rear wall (7) of the exchanger plate (4); and the cooling module (3) comprises a plurality of interface elements (15), which are placed inside the circulation chamber (5) of the exchanger plate (4), are shaped like a wave, are oriented parallel to the front wall (6) and to the rear wall (7) of the exchanger plate (4), and are arranged in rows (16), which are placed between the front wall (6) of the exchanger plate (4) and the rear wall (7) of the exchanger plate (4) with a distance other than zero between one row (16) and the adjacent rows (16) and are oriented parallel to the front wall (6) and to the rear wall (7) of the exchanger plate (4);

wherein the number of interface elements (15) making up each row (16) progressively increases from the front wall (6) of the exchanger plate (4) towards a center of the exchanger plate (4) and progressively decreases from the center of the exchanger plate (4) towards the rear wall (7) of the exchanger plate (4).

2. The cooling module (3) according to claim 1, wherein the number of interface elements (15) making up each row (16) is different from row (16) to row (16) so that the number of interface elements (15) making up each row (16) is different from the number of interface elements (15) making up the two adjacent rows (16).

3. The cooling module (3) according to claim 1, wherein the number of interface elements (15) making up each row (16) varies in a symmetrical manner relative to the center of the exchanger plate (4).

4. The cooling module (3) according to claim 1, wherein some rows (16) of interface elements (15) are integral just and only to the first side wall (8) of the exchanger plate (4) and they are spaced from the second side wall (9) of the exchanger plate (4) and the remaining rows (16) of interface elements (15) are integral just and only to the second side wall (9) of the exchanger plate (4) and are spaced from the first side wall (8) of the exchanger plate (4).

5. The cooling module (3) according to claim 4, wherein the rows (16) of interface elements (15) integral with the first side wall (8) of the exchanger plate (4) are aligned to and face corresponding rows (16) of interface elements (15) integral with the second side wall (9) of the exchanger plate (4).

6. The cooling module (3) according to claim 5, wherein:
the waves of each interface element (15) have a succession of troughs (17), which rest against and are fixed to a side wall (8, 9) of the exchanger plate (4) and a succession of crests (18) which are placed at a distance other than zero from the other side wall (9, 8) of the exchanger plate (4); and a distance (H1) between the crests (18) of the interface elements (15) integral with the first side wall (8) of the exchanger plate (4) and the crests (18) of the interface elements (15) integral with the second side wall (9) of the exchanger plate (4) is equal to 20-45% of a distance (H2) between the first side wall (8) of the exchanger plate (4) and the second side wall (9) of the exchanger plate (4).

7. The cooling module (3) according to claim 1, wherein the wavelength of the waves of each interface element (15) is always constant and is equal to 55-70% of a distance (H2) between the first side wall (8) of the exchanger plate (4) and the second side wall (9) of the exchanger plate (4).

8. The cooling module (3) according to claim 1, wherein the waves of each interface element (15) each have an asymmetrical shape, in which an initial half-wave has an amplitude which is smaller than an amplitude of a final half-wave.

9. The cooling module (3) according to claim 1, wherein:
the waves of each interface element (15) have the respective crests (18) flattened, so that each crest (18) is flat and parallel to the side walls (8, 9) of the exchanger plate (4);
the waves of each interface element (15) are made up of a succession of flat panels;
an angle ($\alpha$) defined between a crest (18) and the following panel is smaller than 20°; and
an angle ($\beta$) defined between a crest (18) and the previous panel is smaller than 60°.

10. The cooling module (3) according to claim 1, wherein:
the waves of each interface element (15) have the respective troughs (17) flattened, so that each trough (17) is flat and parallel to the side walls (8, 9) of the exchanger plate (4);
the waves of each interface element (15) have the respective crests (18) flattened, so that each crest (18) is flat and parallel to the second side wall (9) of the exchanger plate (4); and
each crest (18) has a greater extension than the troughs (17).

11. The cooling module (3) according to claim 1, wherein the waves of each interface element (15) are made up of a succession of flat panels.

12. The cooling module (3) according to claim 1 and comprising flat heating elements (19), which are fixed to the first side wall (8) of the exchanger plate (4) and to the second side wall (9) of the exchanger plate (4) and are designed to be traversed by an electric current in order to produce heat by Joule effect.

13. The cooling module (3) according to claim 12, wherein the heating elements (19) are fixed to an outer surface of the side walls (8, 9) of the exchanger plate (4) on the opposite side of the circulation chamber (5).

14. The cooling module (3) according to claim 12, wherein the heating elements (19) are PTC thermistors, whose electrical resistance increases as the temperature increases.

15. An electrical energy storage system (1) for an electric drive vehicle including the cooling module as set forth in claim 1 and wherein the storage system (1) comprises:
a plurality of rechargeable electrochemical storage cells (2) with the shape of a parallelepiped, which are placed parallel to one another beside one another; and
a plurality of cooling modules (3), which have the shape of a parallelepiped and are interleaved with the rechargeable electrochemical storage cells (2).

16. The electrical energy storage system (1) for an electric drive vehicle;
the storage system (1) comprises:
a plurality of rechargeable electrochemical storage cells (2) having the shape of a parallelepiped, which are placed parallel to one another beside one another; and
a cooling circuit which is designed to circulate a cooling liquid and comprises a plurality of cooling modules (3), which have the shape of a parallelepiped, are interleaved with the rechargeable electrochemical storage cells (2), and are designed to be traversed by a cooling liquid;
wherein the cooling circuit internally integrates a phase-change material which is housed in at least one compartment that is hydraulically isolated from the cooling liquid and is thermally coupled to the cooling liquid.

\* \* \* \* \*